L. J. SCHNEIDER.
INSTANTANEOUS ELECTRIC WATER HEATER.
APPLICATION FILED MAR. 15, 1920.
1,362,356.
Patented Dec. 14, 1920.
2 SHEETS—SHEET 2.
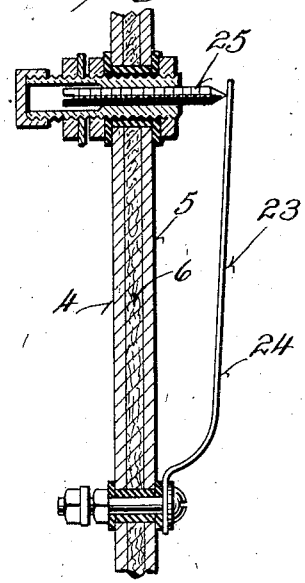
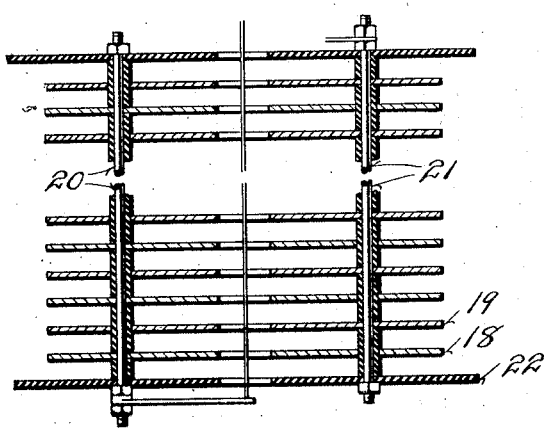
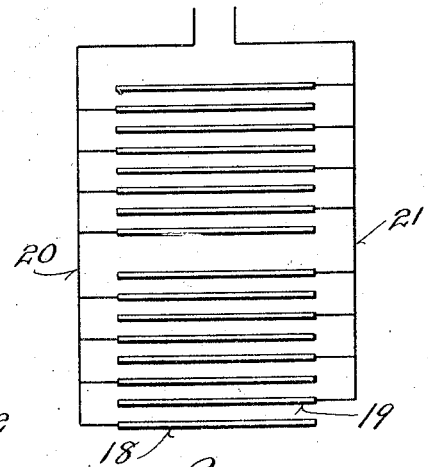
Witness
T. P. Britt
Inventor
Louis J. Schneider
By Young & Young
Attorneys

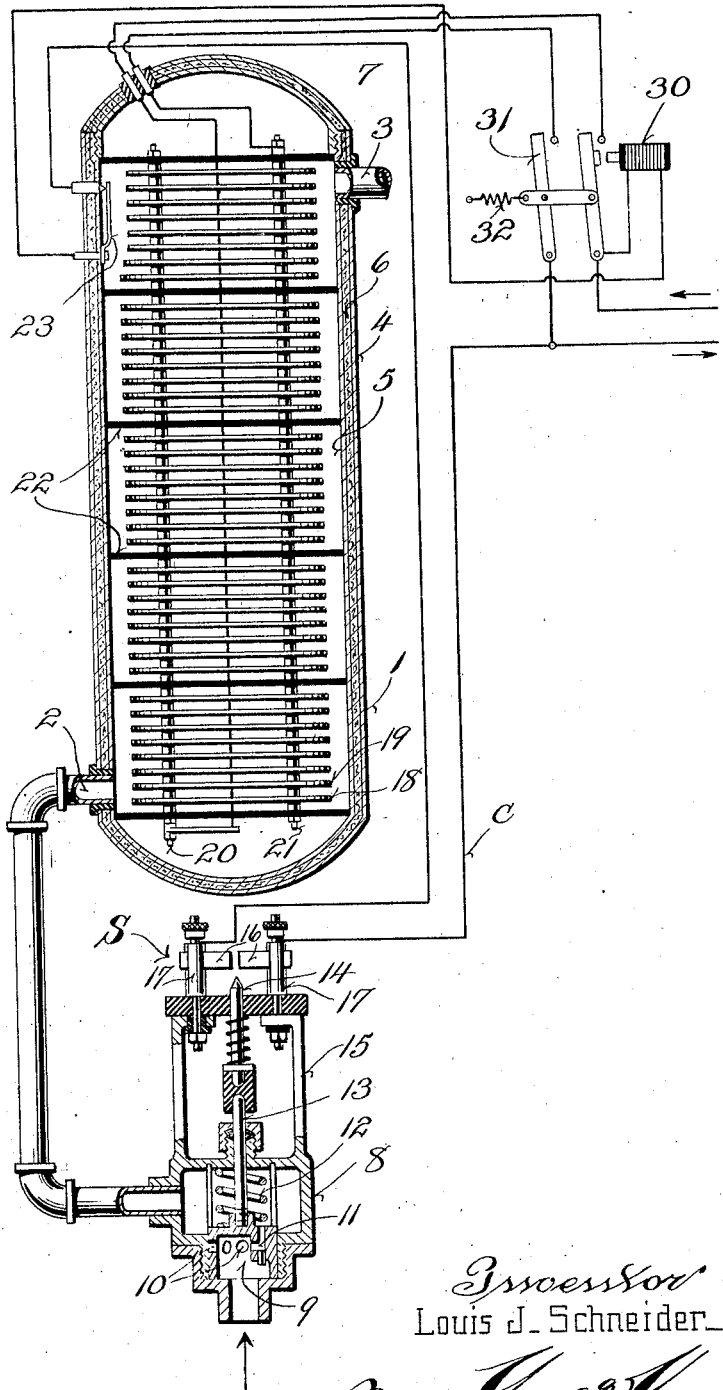

UNITED STATES PATENT OFFICE.

LOUIS J. SCHNEIDER, OF MILWAUKEE, WISCONSIN, ASSIGNOR OF ONE-HALF TO EDWIN W. STRAUSS, OF MILWAUKEE, WISCONSIN.

INSTANTANEOUS ELECTRIC WATER-HEATER.

1,362,356.     Specification of Letters Patent.     Patented Dec. 14, 1920.

Application filed March 15, 1920. Serial No. 365,743.

*To all whom it may concern:*

Be it known that I, LOUIS J. SCHNEIDER, a citizen of the United States, and resident of Milwaukee, in the county of Milwaukee and State of Wisconsin, have invented certain new and useful Improvements in Instantaneous Electric Water-Heaters; and I do hereby declare that the following is a full, clear, and exact description thereof.

My invention relates to new and useful improvements in hot water heating apparatus which is particularly adapted for household use and which is regulated by electricity.

That type of hot water heater known as an instantaneous heater has come into more or less general use and has proven quite successful. My invention pertains to such a heater and has for its object to provide an apparatus of this character which, while more simply constructed than the usual instantaneous heater will be found to be much more efficient. This increase in efficiency is procured primarily through the use of electricity as a water heating means.

A further object of the invention is to provide a means controllable by the flow of water for opening and closing an electrical switch which breaks or makes the electrical circuit connected with the heater proper.

Another object of the invention relates to means for automatically breaking the electrical circuit when the temperature of the water being heated reaches a predetermined degree.

With these general objects in view the invention resides in the novel features of construction, combination and arrangement of parts which will be hereinafter more particularly described and claimed.

In the accompanying drawings:

Figure 1 represents a vertical sectional view through a hot water heater provided with my improved electric heating apparatus together with a combined fluid valve and switch for controlling the circuit of the latter, said circuit being diagrammatically represented.

Fig. 2 is an enlarged detail sectional view showing particularly the thermostatic means for breaking the electrical circuit when the water which is being heated has attained a predetermined temperature.

Fig. 3 is a similar view of portions of the liquid heating means.

Fig. 4 is a diagrammatic view illustrating the manner in which I preferably arrange the heating elements used in my apparatus.

Referring now more particularly to the drawings, especially to Fig. 1, it will be seen that the major portions of the heating apparatus are located within a suitable liquid container 1 having an inlet 2 at its lower end and an outlet 3 at its upper end. In the present instance I preferably construct this container of a pressed sheet metal outer shell 4 and a similar inner shell 5 between which is interposed a layer 6 of insulating material.

The bottom is formed as a portion of the main part of the container, while the top 7 has a screw threaded connection with the latter.

Water entering the container 1 through the inlet 2 comes from a suitable source of supply and in flowing from the latter to the former passes through a valve casing 8 in which is located an inverted cup shaped valve 9 having an apertured skirt portion 10 in which is also located a bleed 11. From Fig. 1 it will be seen that this valve 9 opens in the direction of the flow of water through the casing 8 against the tension of a spring 12, the same retaining the valve in closed operation when water is not flowing.

A stem 13 extends from the valve 9 exteriorly of the casing 8 and is connected with although insulated from a movable contact pin 14 of an electric switch S. This switch is very compactly associated with the valve mechanism just described by being mounted upon bracket arms 15 which extend from the casing 8. The stationary contacts 16 of the switch are secured to binding posts 17 which are connected by an insulated plate secured to said bracket arms 15.

This switch S is included in an electrical circuit C which is supplied with current from a suitable source of supply for operating the heating means disposed within the tank 1. This means comprises a series of spaced, preferably flat terminal heating plates mounted within and submerged in the water contained in tank 1.

Extending longitudinally of the tank and transversely of the plates 18 and 19 are a pair of electrode rods 20 and 21. From Figs. 4 and 3 it will be seen that the plates 18 are in contact with the rod 20 and insulated from the rod 21 whereas the plates 19, one of which is arranged between each pair of the first mentioned plates are in contact with the rod 21 and insulated from the rod 20. Thus the plates 18 forming one series are insulated from the plates 19 of the other series and any current which flows from one to the other must pass through the water surrounding the same.

The several terminal plates 18 and 19 are divided into a plurality of groups each of which is separated by a perforated insulating supporting plate 22. These plates 22 engage the wall of the tank 1 and aid the rods 20 and 21 in supporting the heating mechanism. Such an arrangement of parts permits the complete heating mechanism to be readily removed from the container.

A second electrical circuit C enters the container through its top 7 and one wire is connected to the lower end of the rod 20, whereas the other wire is connected to the upper end of the rod 21, while arranged in said circuit C and in series with the switch S is a thermostatic cut out 23, the construction of which is clearly shown in Fig. 2. Thus when the water in the container becomes heated above a predetermined degree, the movable arm 24 of the cut out will move away from the stationary contact 25 and thus break the circuit C.

The electrical circuit C' is directly controlled by the condition of the circuit C, for instance when the latter circuit is complete an electromagnet 30 is energized and a two-pole switch 31 in the circuit C' is closed to permit the flow of electricity to the heating elements within the container 1 therefor. On the other hand when the switch S or the thermostat 23 is open, the circuit C is broken and the electromagnet 30 deënergized. Simultaneously with the deënergization of the electromagnet, the switch 31 is thrown to open position by a contractile spring 32 thus breaking the heating element circuit C'.

It is obvious that the flow of water through the container 1 with the consequent opening of the valve 9 and the closing of the switch S is occasioned by the opening of a faucet or the like at some point in the water system remote from the container 1. The electrical current can thus flow from the terminal heating plates 18 through the water to the similar and corresponding plates 19, the water thereby being quickly and continuously heated so long as the faucet is open and water is flowing through the valve casing 8, or until the heat of the water reaches such a high degree that the cut-out 23 will become active and automatically break the circuit C.

I claim:

1. In a liquid heating apparatus, a liquid container having an inlet and an outlet, an electric liquid heating means in said container and including a pair of supporting rods disposed therein, a plurality of spaced terminal heating plates in the container and carried by the supporting rods, each alternate plate being in contact with one of the rods and insulated from the other rod whereby the plates will be insulated from each other, an electric circuit having said rods included therein, and means for passing a current through said circuit, the current flowing from the plates in contact with one rod and through the liquid surrounding the same to the plates in contact with the other rod.

2. In a liquid heating apparatus, a liquid container, a plurality of flat terminal heating plates, said plates being spaced apart and submerged within the liquid of the container, an electrode rod electrically connected with each alternate plate, a second electrode rod electrically connected with the other plates, and means for supplying current to the rods, said current flowing through the liquid in the container from the plates connected with one rod to those connected with the other.

3. In a liquid heating apparatus, a liquid container, and a heating unit removably disposed in said container and comprising a pair of spaced supporting plates engaging the interior wall of the container transversely thereof, a plurality of terminal heating plates disposed between the supporting plates in spaced apart relation and substantially parallel thereto, the heating plates being spaced from the container wall, a pair of rods extending through the several plates transversely thereof and longitudinally of the container, said rods each being insulated from the supporting plates and from certain of said heating plates, and electric current conducting wires connected with the rods.

4. In a liquid heating apparatus, a liquid container, and a heating unit removably disposed in said container and comprising a plurality of terminal heating plates disposed in spaced apart relation transversely of the container, said plates being spaced from the container wall and arranged in a plurality of groups, an insulating supporting plate separating each of said groups and engaging the container wall transversely thereof, said supporting plates being provided with fluid passage openings, a pair of spaced rods extending longitudinally of the container through the several plates to hold the same rigidly spaced and insulated, said rods each being insulated from the supporting plates and certain heating plates in each group and electrically connected with the other heating plates, current conducting wires connected with the rods.

5. In a liquid heating apparatus, a liquid container, an electric liquid heating means in said container, a normally broken main electric circuit including the said heating means, and a normally broken auxiliary electric circuit, said auxiliary circuit being automatically closed upon passage of liquid through the container to likewise close the main circuit.

6. In a liquid heating apparatus, a liquid container, an electric liquid heating means in said container, a switch including an armature carrying arm, an electromagnet controlling said switch, a main electric circuit including the heating means and said switch, the latter being normally open, and a normally broken auxiliary circuit including said electro-magnet, said auxiliary circuit being automatically closed upon passage of liquid through the container whereby to energize said electro-magnet and close the main circuit.

In testimony that I claim the foregoing I have hereunto set my hand at Milwaukee, in the county of Milwaukee and State of Wisconsin.

LOUIS J. SCHNEIDER.